Patented Nov. 8, 1927.

1,648,839

UNITED STATES PATENT OFFICE.

WILLIAM S. CALCOTT, OF PENNS GROVE, NEW JERSEY; ARTHUR R. HITCH, OF WILMINGTON, DELAWARE; AND HERMANN W. MAHR, OF PENNS GROVE, NEW JERSEY, ASSIGNORS TO E. I. DU PONT DE NEMOURS & COMPANY, OF WILMINGTON, DELAWARE, A CORPORATION OF DELAWARE.

PROCESS OF MAKING 2,3-HYDROXYNAPHTHOIC ACID.

No Drawing.   Application filed February 23, 1924.   Serial No. 694,765.

This invention relates to the production of 2,3-hydroxy-naphthoic acid, and comprises heating a beta-naphtholate in the presence of carbon dioxide at a given high temperature, and at a pressure above the dissociation pressure of the alkali-metal salt of 2,1-hydroxy-naphthoic acid at said given temperature.

In the reaction of carbon dioxide upon alkali-metal beta naphtholate, two isomers are formed,—the alkali-metal salt of the 2,1-hydroxy-naphthoic acid and the alkali-metal salt of the desired 2,3-hydroxy naphthoic acid:

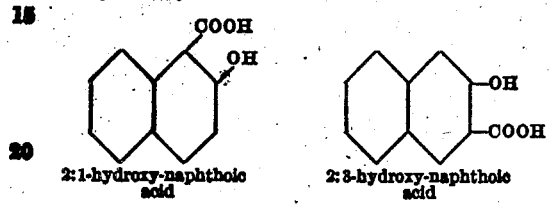

2:1-hydroxy-naphtholic acid    2:3-hydroxy-naphtholic acid

At temperatures below 170° C., the 2,1-derivative is formed in larger amounts; at higher temperatures the formation of the 2,3-derivative prevails, but much of the 2,1-derivative formed at the same time undergoes considerable decomposition resulting in a decrease in the yield of the desired product.

We have now discovered that the reaction between carbon dioxide and the beta naphtholate to form 2,3-hydroxy-naphthoic acid may be carried on at temperatures well above 170° C., and the decomposition of the 2,1-derivative prevented, by maintaining the carbon dioxide at a pressure above the decomposition-pressure of the 2,1-hydroxy-naphthoate at the temperature prevailing during the reaction. By preventing the decomposition of the 2,1-derivative the yield of 2,3-derivative is increased since the latter is produced from the former by isomerization.

By "decomposition-pressure" we mean the pressure of carbon dioxide below which the 2,1-hydroxy-naphthoate begins to decompose at the temperature employed. The preferred temperature range for the formation of the 2,3-hydroxy-naphthoic is from about 225 to 250° C. The decomposition-pressure curve throughout this range for the 2,1-hydroxy-naphthoate may be indicated by the following table:

| Temperature. | Dissociation pressure. |
|---|---|
| 225° C. | 375 lbs. sq. inch. |
| 235° C. | 450 lbs. sq. inch. |
| 250° C. | 600 lbs. sq. inch. |

The pressure values given in the above table are only approximate, but are sufficiently accurate to serve as a guide to the successful practice of our invention.

Working in accordance with the ideas above set forth, we observed, for example, that when the reaction of dry carbon dioxide upon anhydrous alkali-metal, beta-naphtholate, and the conversion of the resulting alkali-metal naphthol-carbonate to the alkali metal salt of the 2,1- and 2,3-hydroxy-naphthoates, was carried out under a carbon dioxide pressure of 500 lbs. per square inch or higher at a temperature of 225° C., a much greater yield of the desired 2:3-derivative was obtained than at the lower pressures; also, that the proportionate amount of decomposition products derived therefrom was much lower.

The new process may be further illustrated by the following example, to which however the invention is not limited: Example: In a suitable high pressure apparatus, equipped with a stirrer and appropriate device for measuring temperatures and pressures, 500 parts of powdered anhydrous sodium beta naphtholate are placed. The naphtholate is well agitated, during which dry carbon dioxide gas is forced in until a pressure of 500 lbs. or greater per square inch is reached. The pressure of 500 lbs. and temperature of 225° C. to 235° C. are maintained for about 10 hours, stirring constantly. After cooling, the contents of the apparatus are extracted with water and the 2,3-hydroxy-naphthoic acid recovered by well known methods.

The various conditions under which the operation is carried out may be varied within wide limits. The temperatures of operation may be changed to meet the desired requirements; for instance, temperatures above 180° C. will give the desired results and, generally speaking, the temperatures of operation may be carried to any point short of the decomposition temperature of the desired product. It is obvious that, in a process of manufacturing 2,3-hydroxy-naphthoates, it is undesirable to operate at such temperatures as will decompose the desired product with consequent diminution in yield.

We claim:

1. The process of producing 2,3-hydroxy-naphthoic acid which comprises heating a beta-naphtholate in contact with carbon dioxide at a temperature above 180° C. while maintaining the pressure of said carbon dioxide above the decomposition-pressure of 2,1-hydroxy-naphthoate at the temperatures prevailing during the reaction, said temperatures being below that at which an undesirable chemical change occurs in the 2,3-hydroxy-naphthoate.

2. A process as set forth in claim 1 in which the reaction between the carbon dioxide and the beta-naphtholate is carried on at temperatures between 200 and 300° C.

3. The process of producing the 2,3-hydroxy-naphthoic acid which comprises subjecting an alkali-metal beta-naphtholate to the action of carbon dioxide at a temperature of from about 225° C. to 250° C., the pressure of the carbon dioxide being maintained sufficiently high to prevent appreciable decomposition of any 2,1-hydroxy-naphthoate that may be formed in the course of the reaction.

4. A process as set forth in claim 3 in which the temperature is maintained at from 225 to 235° C., and the carbon dioxide is maintained at a pressure of from about 450 to 600 pounds per square inch.

5. The process of producing 2,3-hydroxy-naphthoic acid which comprises heating a material comprising an alkali-metal beta-naphtholate in the presence of carbon dioxide at temperatures between about 200 and 300° C., and maintaining the pressure of the carbon dioxide so high as to inhibit decomposition at said temperatures of any alkali-metal 2,1-hydroxy-naphthoate formed.

In testimony whereof we affix our signatures.

WILLIAM S. CALCOTT.
ARTHUR R. HITCH.
HERMANN W. MAHR.